United States Patent
Molen

(10) Patent No.: US 9,272,656 B2
(45) Date of Patent: Mar. 1, 2016

(54) APPARATUS AND METHOD FOR COVERING A TRANSPORTABLE LOAD

(76) Inventor: Bernie Vander Molen, Ontario, CA (US)

( * ) Notice: Subject to any disclaimer, the term of this patent is extended or adjusted under 35 U.S.C. 154(b) by 716 days.

(21) Appl. No.: 12/434,632

(22) Filed: May 2, 2009

(65) Prior Publication Data
US 2012/0187232 A1 Jul. 26, 2012

Related U.S. Application Data

(60) Provisional application No. 61/143,784, filed on Jan. 10, 2009.

(51) Int. Cl.
*B65H 16/02* (2006.01)
*B60P 7/08* (2006.01)

(52) U.S. Cl.
CPC .................................... *B60P 7/0876* (2013.01)

(58) Field of Classification Search
CPC ........ B65H 75/42; B65H 75/38; B65H 75/28; B65H 75/403; B65H 2701/35; B60J 7/085
USPC ........ 242/403, 533.8, 557, 598, 598.5, 597.1, 242/597.2, 919; 296/98
See application file for complete search history.

(56) References Cited

U.S. PATENT DOCUMENTS

| | | | | |
|---|---|---|---|---|
| 495,156 A | * | 4/1893 | Howard | 242/403 |
| D155,897 S | * | 11/1949 | Huntington | D6/523 |
| 3,478,980 A | * | 11/1969 | Raasch | 242/403 |
| 3,908,922 A | * | 9/1975 | Guthrie et al. | 242/597 |
| 4,179,080 A | * | 12/1979 | Patnaude | 242/403.1 |
| 5,956,923 A | * | 9/1999 | Andros et al. | 242/403 |
| 6,502,709 B1 | * | 1/2003 | Parker | 296/98 |
| 6,595,594 B2 | * | 7/2003 | Royer | 296/98 |
| 6,634,850 B2 | * | 10/2003 | Christensen | 414/607 |
| 6,805,395 B2 | * | 10/2004 | Royer | 296/98 |
| 6,811,202 B2 | * | 11/2004 | Hornady | 242/919 |
| 7,182,387 B2 | * | 2/2007 | Hartman et al. | 296/98 |
| 7,611,187 B1 | * | 11/2009 | Rogers | 296/98 |
| 7,918,414 B1 | * | 4/2011 | Davis et al. | 242/557 |
| 2002/0043816 A1 | * | 4/2002 | Johnston | 296/98 |

* cited by examiner

*Primary Examiner* — William A Rivera
(74) *Attorney, Agent, or Firm* — Stolmar & Partner; Robert Lelkes

(57) ABSTRACT

An apparatus and method for applying a flexible tarpaulin or other cover to a load which is transportable on a cargo carrier, such as a bed of a trailer truck or the like. The apparatus in preferred forms comprises a block like member which is weighted to counter-act any force imposed on this member. For example, slots in the block like member to receive the forks of the fork lift truck is effective for this purposes. An arm is mounted on and extends outwardly from this block-like member to receive a tube or spindle or spool and which contains a cover wounded thereon. The tube will rotate effectively on the arm as the forklift or other power mover is moved longitudinally with respect to the length of the truck and the cover will unwind from the tube and be draped over the load.

17 Claims, 7 Drawing Sheets

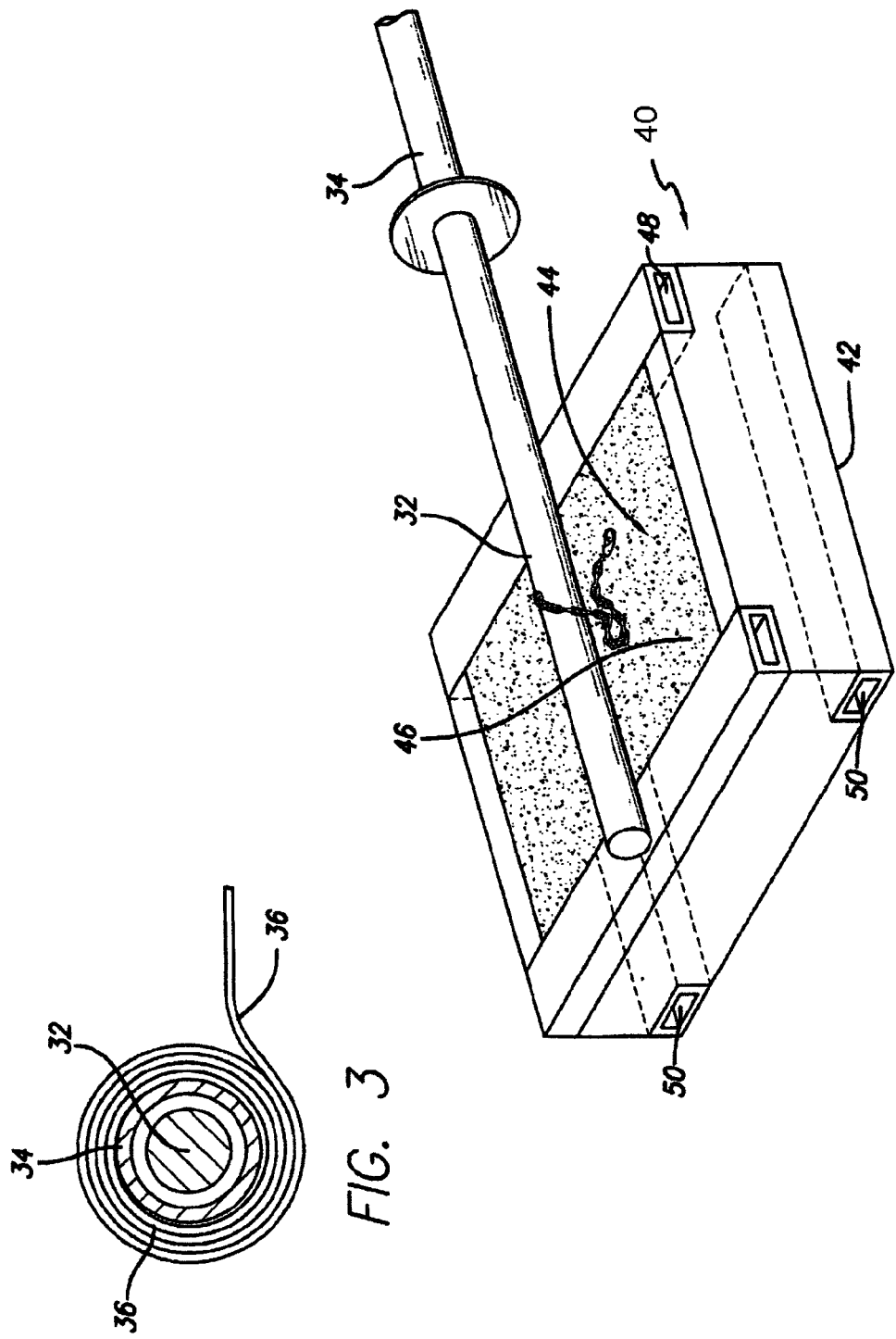

APPARATUS AND METHOD FOR COVERING A TRANSPORTABLE LOAD

RELATED APPLICATION

This application is based on and claims for priority the filing date of my U.S. Provisional Patent Application Ser. No. 61/143,784 filed Jan. 10, 2009 for Apparatus and Method for covering a Transportable Load, the full contents of which are incorporated herein by reference.

BACKGROUND OF THE INVENTION

1. Field of the Invention

This invention relates in general to new certain and useful improvements in both an apparatus and a method for automatically feeding to and covering a load with a tarpaulin or similar cover wound about an elongate tube as the tube is moved longitudinally with respect to the load on a flat bed truck or the like. More particularly, the apparatus and method of this type which reduces the incidents of injury and even death which arises from a need to climb on a truck bed for purposes of applying the cover to the load.

2. Brief Description of Related Art

It is a very common practice to attempt to drape a tarpaulin or similar flexible cover over a load on a flat bed truck, or for that matter, even on a railroad car in order to protect a load from weather conditions, temperature changes, road debris and the like. Moreover, tarpaulin covers of this type are partially effective in reducing the incidents of vandalism as for example, vandals or so-called "taggers" with spray cans of paint who otherwise may imprint a logo on the cargo.

In the application of a tarpaulin or other cover to a load on a flat bed truck trailer, it frequently is necessary for the driver or other personal to climb onto the flat bed truck and attempt to pull the tarpaulin over the load and to thereafter tie the tarpaulin straps or so called ties to the truck bed. However and even though the height of the truck bed may only be five feet from the road surface, a fall from that truck bed can result in serious injury, if not death. Moreover, because there are straps on the tarpaulin for tying the same, it is easy for a worker to get his or her foot caught in one of these straps or other portions of the load and trip and fall off of the bed of the truck, resulting in injury or death.

It can be observed that with the presence of the load on a truck, it becomes a difficult or even dangerous task to attempt to pull the tarpaulin across the load, particularly when standing on the bed of the truck.

Because of an increase in the number of occurrences of falling off a trailer bed, liability insurance costs have increased substantially and in some cases, organizations which ship goods by truck trailers are demanding a better means of transporting cargo with covers thereon, which would eliminate the need for manual labor to climb on the trailer. In many cases, haulers are often prone to just disregard the need a tarpaulin over the load, resulting in weather damage or other damage to the cargo carried thereon.

ADVANTAGES OF THE INVENTION

It is therefore, one of the primary advantages of the present invention to provide an apparatus which automatically unspools a tarpaulin over a load on a truck bed or similar bed cargo carrier thereby allowing the tarpaulin to be secured to the truck bed or other carrier, without need for manual labor to climb onto the bed of the carrier. It is another advantages of the present invention to provide an apparatus of the type stated which uses a spool containing a cargo cover or tarpaulin wound thereon and which allows for automatic un-spooling and un-winding of the tarpaulin from that spool so that the latter can be draped over a load on a truck or like carrier.

It is a further advantages of the present invention to provide a apparatus and method for applying a tarpaulin like cover to a cargo on a truck bed or other carrier bed in which the tarpaulin cover can be automatically fed from a tube and draped over the load on the truck bed, using a fork-lift or similar driven member which allows the tube to be shifted longitudinally with respect to the load on the carrier bed. An apparatus of the type stated which substantially reduces the amount of injury and even accidental death arising from the falling off of a truck bed along with attendant medical costs and insurance costs associated therewith.

The present invention to provide a method of enabling a tarpaulin to be draped over and secured to a bed of a common carrier without the need for personnel to climb on to the bed of that carrier. The apparatus of the present invention provides an apparatus of the type stated which applies a tarpaulin-like cover to a load on a transport carrier and which allows the apparatus to be rapidly and easily disassembled and stored when not in use and which thereby occupies a relatively small amount of space.

My invention therefore resides in the novel features of form, construction, arrangement, and combination of parts as presently described and pointed out in the claims.

BRIEF SUMMARY OF THE INVENTION

The present invention relates to an apparatus for dispensing a tarpaulin and draping the tarpaulin over a load on a carrier bed, as for example, a truck bed. The apparatus of the invention provides for minimal personnel intervention and thereby eliminates a large percentage of accidents and even accidental deaths which are caused by someone falling off the truck bed or the load on that truck bed. This is particularly true where personal may have climbed to that position to aid in the application of that tarpaulin to the load on the carrier bed.

The invention is generally comprised of a carrier box which has a flat lower surface portion sized to fit on a truck bed and to be held in a stable position thereon. Some means is associated with this carrier box to removably engage the carrier box and thereby enabling movement through a powered mover, such as a fork lift truck. For this purposes, the carrier box is preferably weighted so that it can not be inadvertently turned while on the truck bed and even more importantly, will not cause the forklift truck to be tipped over during movement of the carrier box in a manner as hereinafter described.

An elongate arm is mounted on the carrier box and extends axially outwardly from this carrier box for a distance sufficient to receive a tube or spool containing the tarpaulin cover wound thereon. This tarpaulin is typically formed of a flexible cover-like material which is rolled on the tube or spool. In this way, the tube which may be a cardboard tube, actually functions as a spool since the tarpaulin cover can be pulled and unwound from the spool during longitudinal shifting movement of the carrier box and hence the tube movable therewith.

When the forklift truck is moved longitudinally, relative to the bed of the truck trailer and the latter remains stationary the tarpaulin will be automatically dispensed from the tube on which it is wound. The weight of the tarpaulin cover will allow the cover to drape over the load of the flat bed truck. In this way, the tarpaulin cover can then be secured to either the truck or otherwise the load on the truck bed. In accordance with this construction, it can be seen that the manual intervention which normally had been required in the past is now eliminated and hence, the risk arising from an attempt to provide the cover over the load is minimized if not fully eliminated.

Inasmuch as, the arm may extend outwardly from the carrier box for some distance, when the latter is carried and moved by a forklift truck, there is a substantial moment arm force imposed on the forklift truck. For this reason, it is important for the carrier box to be weighted and thereby overcome any forces which might tend to turn over the forklift truck as a result of a long moment arm.

The apparatus of the invention is also provided with an automatically lockable and releasable lock secured to one end of the elongate arm such as the outer end. In an preferred embodiment, this lock may adopt the form a pivotal link that is pivotally mounted on the end of the arm. When located in a certain position, the link will rotate to a position where it will lock the tube containing the tarpaulin cover from being automatically pulled off of the end of the arm.

In of a preferred embodiment of the invention, the link is mounted within a uniquely designed slot at the end of the arm. The slot is arranged so that one part of the slot has a longer length than an oppositely disposed side of the slot. In this way, when the link rotates, it will effectively lock the tube onto the arm. However, it should be understood that any type of locking mechanism could be provided for this purpose.

In addition to the foregoing, the carrier box is also provided with another mechanism for locking the carrier box to the forklift truck. For this purpose, a simple chain could be provided. In this way, the carrier box will not be separated form the forks of the forklift truck or otherwise, from the bed of a hauling vehicle such as the truck trailer.

The present invention thereby provides a unique and novel apparatus and a method for covering a transportable load and which thereby fulfills all of the above-identified objects and other objects which will be more fully apparent from a consideration of the forms in which it may be embodied. One of these forms is more fully illustrated in the accompanying drawings and described in following detailed description of the invention. However, it should be understood that the accompanying drawings and this detailed description are set forth for purposes of illustrating the general principles of the invention.

BRIEF DESCRIPTION OF THE DRAWINGS

Figure 1:
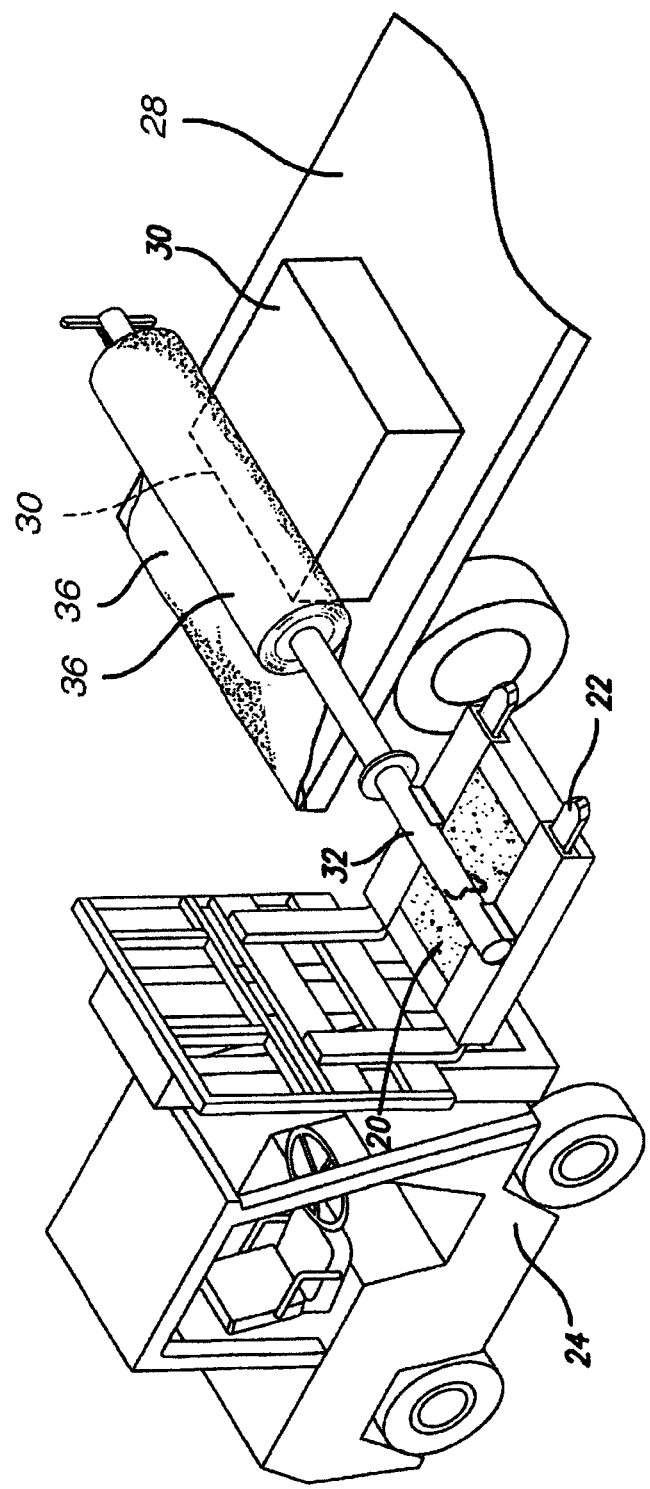
Figure 2:
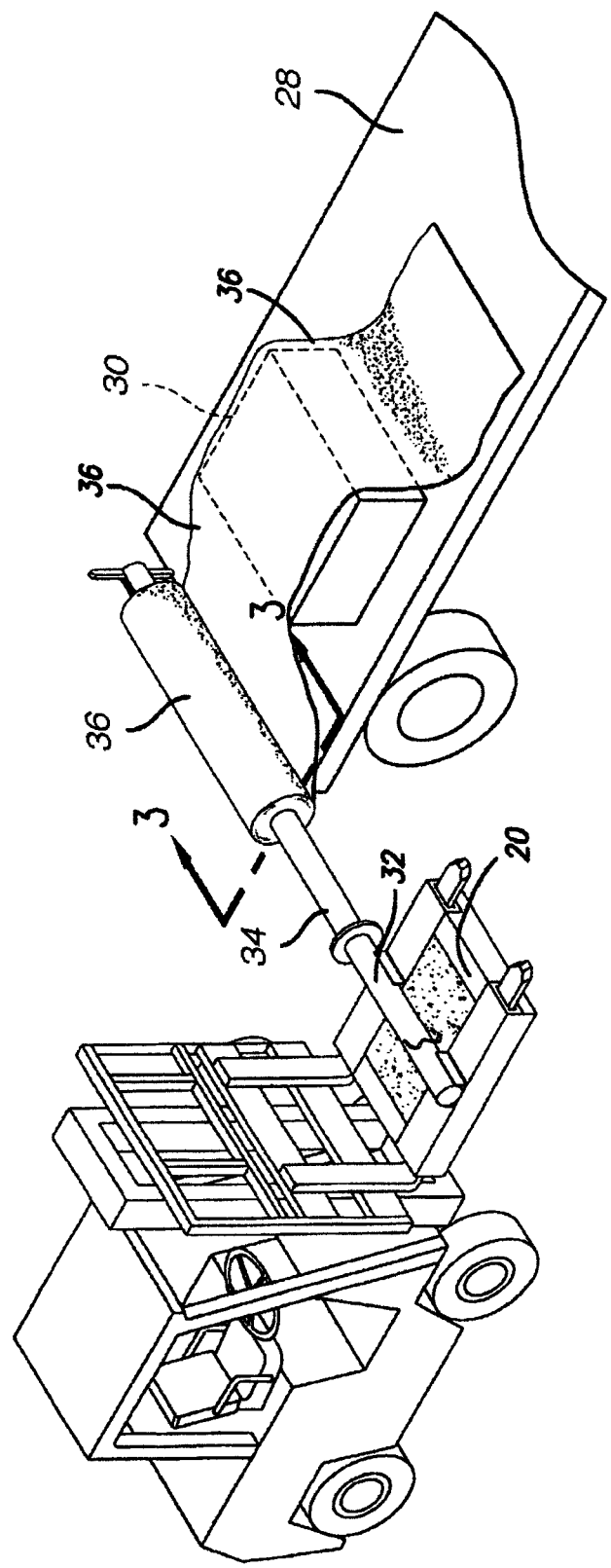
Figure 5:
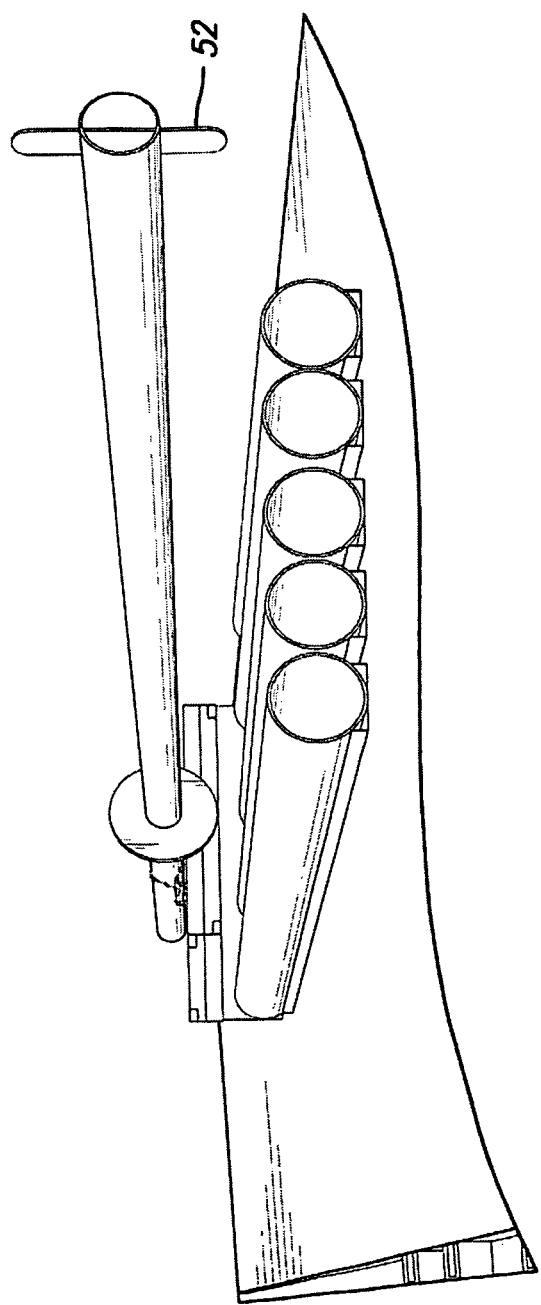
Figure 6:
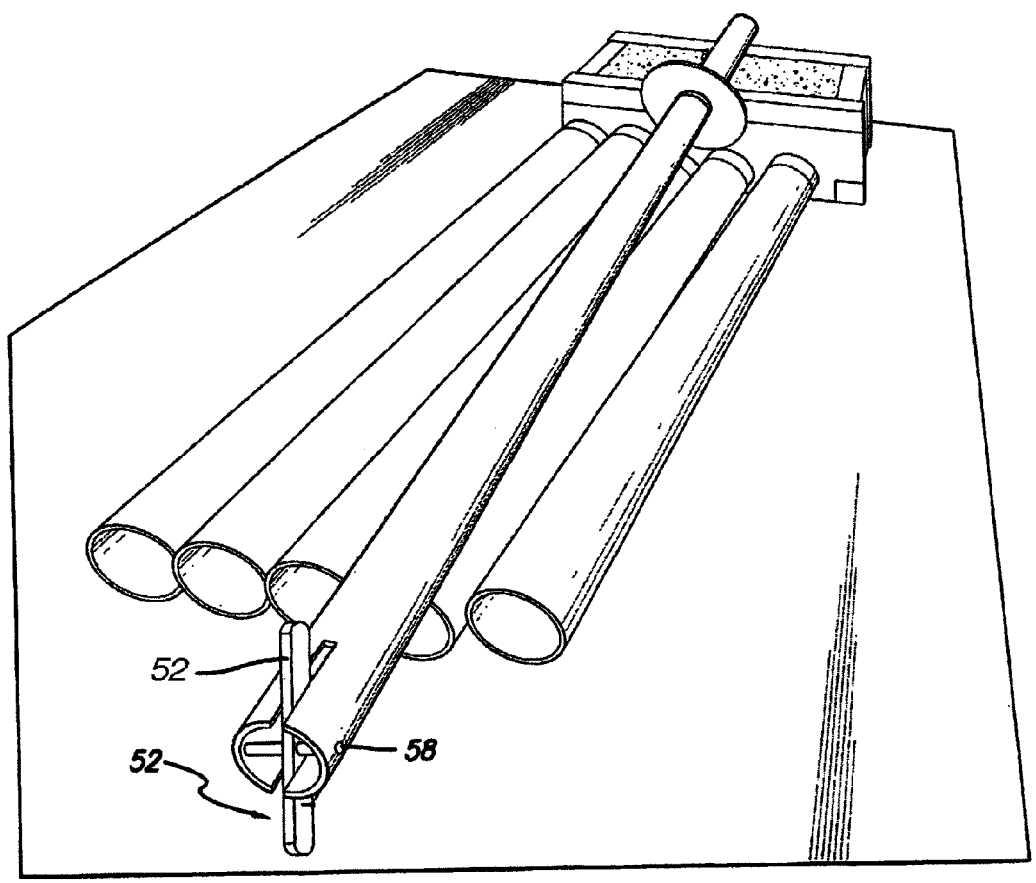
Figure 7:
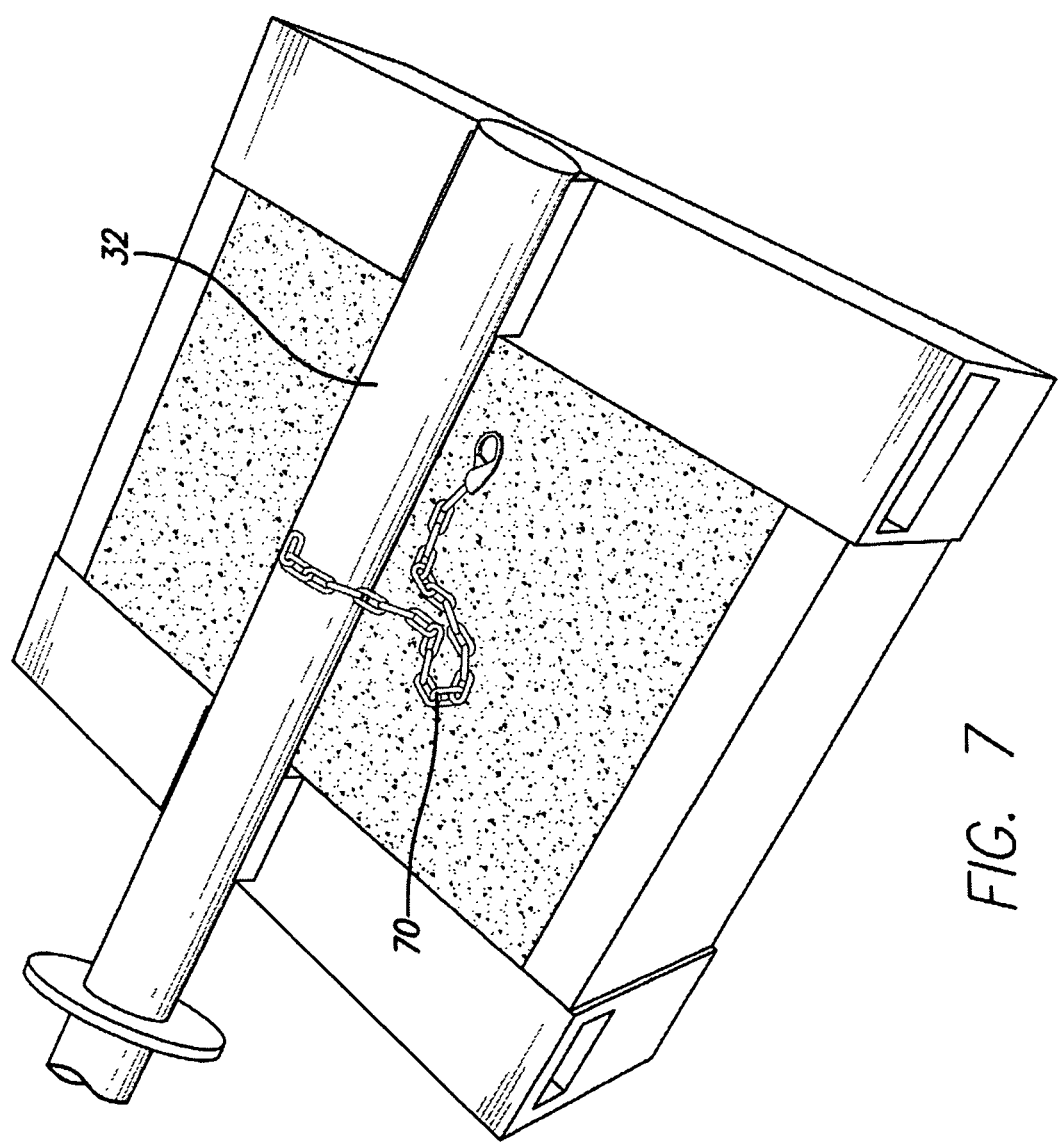
Figure 10:
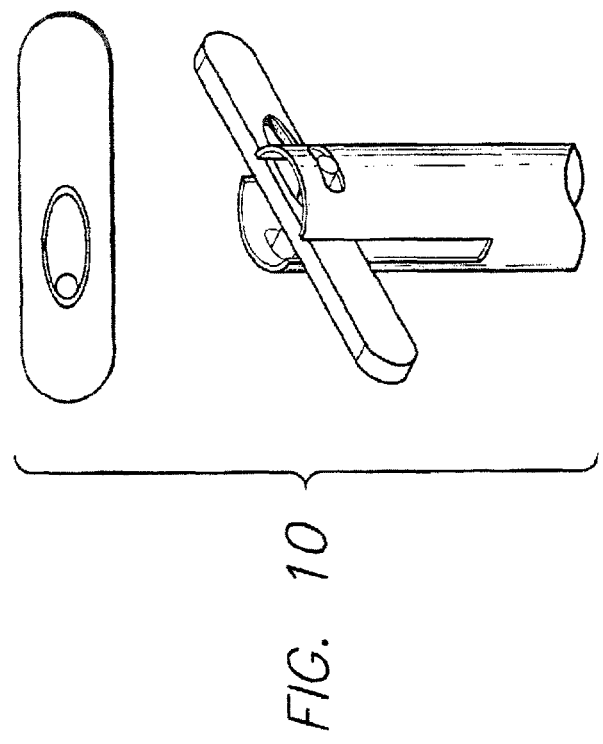
Figure 8:
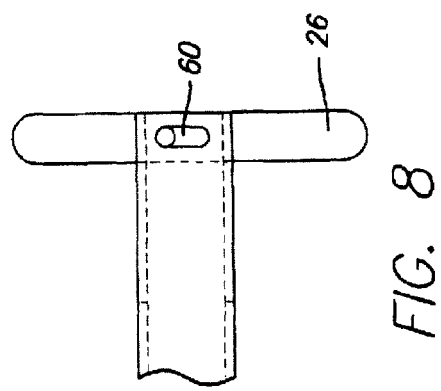
Figure 9:
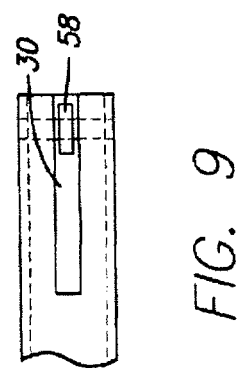

Having thus described the invention in general terms, reference will now be made to the accompanying drawings in which:

FIG. 1 is an exploded fragmentary perspective view, partially broken away, and showing an apparatus for draping a tarpaulin cover over a load in accordance with the present invention;

FIG. 2 is a fragmentary perspective view, similar to FIG. 1, and showing the dispensing of a tarpaulin from a dispensing tube on an arm of the apparatus of the invention;

FIG. 3 is a sectional view taken substantially along the plane of line 3-3 of FIG. 2;

FIG. 4 is a fragmentary perspective view of the invention;

FIG. 5 is a perspective view of a portion of a locking link on an end of a dispensing arm of the present invention;

FIG. 6 is a perspective view of a portion of the locking link of FIG. 5 in a locking position;

FIG. 7 is a fragmentary perspective view of the carrier box of FIG. 4 and a holding chain used therewith;

FIG. 8 is a plan view of a portion of the locking link of FIG. 5;

FIG. 9 is a view of the link of FIG. 8 from a viewpoint rotated 90 degrees with respect to FIG. 8; and FIG. 10 is a fragmentary perspective view and a plan view showing the mounting of the locking link of the invention.

DETAILED DESCRIPTION OF PREFERRED EMBODIMENTS

Referring now in more detail and by reference characters to the drawings which illustrate one of the preferred embodiments of the apparatus of the invention, A designates an apparatus for covering a transportable load. The apparatus is comprised of a carrier block 20 which may be moved on the forks 22 of a forklift truck 24. The forklift truck 24 is of a conventional construction and is, therefore, neither illustrated nor described in any further detail herein.

The apparatus A of the invention operates in conjunction with a carrier, such as a flat bed truck 26, having a truck bed 28. A load 30 is disposed on the bed 28, as shown in FIG. 1. The load may be any form of cargo which is to be transported on the truck bed 28 and is to be covered by a tarpaulin cover.

Mounted on and extending outwardly from one lateral side of the carrier block 20 is an outwardly extending arm or pole 32 or arm and which is preferably circular in cross-sectional shape. The pole 32 could be hollow for purposes of production, if desired, although it may be a solid member. Slidably mounted on the arm 32 is a tubular spindle 34 upon which a tarpaulin cover 36 is rolled, reference being had to FIGS. 2 and 3 of the drawings. In this respect it can be seen that the spindle 34 is removably mounted on the arm 32 in any conventional fashion, preferably by inserting the spindle over the end of the arm 32, while the latter is in a cantilever position. However, any other means for locating the spindle 34 with respect to the load could be used so long as the spindle is rotatable and allowed to pay-off the tarpaulin cover wound thereon.

One preferred embodiment of a carrier block 20 is more fully illustrated in FIG. 4 of the drawings and comprises a rectangulary shaped box 40 having a relatively flat box bottom surface 42 and a central interior cavity 44. Located within this interior cavity 44 is a weighted member, such as for example, a block of pre-formed concrete 46 to provide substantial weight to the carrier box.

The carrier box is provided with longitudinal slots 48 opening at each of the transverse ends thereof as well as lower transverse slots 50 which open on each of the longitudinal sides thereof. In this way a forklift truck can lift and maneuver the carrier box from either a longitudinal direction or transverse direction. The slots 48 and 50 are each sized to receive the forks 22 of the conventional forklift truck. In this way, the carrier box can be lifted and easily installed on the flat bed truck.

Also mounted on the carrier box and extending outwardly therefrom is the arm 32 for receipt of a conventional tube, such as the tube or spindle 34. As indicated previously, the tube could be formed of any conventional material, such as aluminum, or other metal, or even molded plastics, or cardboard, or the like. Preferably and in order to accommodate the weight of the tarpaulin cover the tube is an extruded plastic.

Mounted on the end of the tube 34 is a locking link 52. This locking link 52 is mounted within a pair of slots 54 and 56, through a pivot pin 58 as shown in FIGS. 5 and 6 of the drawings. In this way, the locking link can pivot within the slots 54 and 56. Moreover, by using a pair of slots with one of the slots, such as the slot 58, having a greater length than the slot 56, the locking link 52 can be shifted to either a locked position, as shown in FIG. 6, or an unlocked position as shown in FIG. 9. The link can be locked by rotating the arm to a desired position. Thus, in one position the link could shift via the force of gravity, about the pin 58 so that one end passes through the slot 54 and the other end swings outwardly so that the link is in the unlocked position.

In accordance with the above construction, any tube carried on the arm can be easily removed. In like manner, and by merely raising the arm, the force of gravity will force the link to be shifted to automatically, to a locked position. This allows for an automatic movement of the locking link to a locked position when a tube containing a wound tarpaulin cover thereon is disposed on the arm.

It should also be understood that an elongate slot could be formed in the link with the pin welded or otherwise secured to the link. In this way the pivot point of the link would be fixed on the pipe. However, any arrangement which allows the link to be shifted so as to move between the locked and unlocked position may be used.

Although the locking mechanism shown in FIGS. 5 and 6 is one very effective form of locking mechanism, it should be understood that another kind of locking mechanism could be used. Thus, as a simple example, a locking sleeve can be inserted at the end of the arm to hold the tube with a wound cover thereon.

By reference to FIGS. 9 and 10, it can also be observed that the pin 58 can be shiftable in an elongate slot 60 formed in one of the tubes. In this way, by shifting the orientation of the tube the force of gravity will cause the locking link to rotate from an unlocked position to a locked position and by reversing the movement, the link will shift the pin 58 in a position within the slot allowing the locking link to automatically move to an unlocked position.

Another important locking mechanism employed in the present invention is that illustrated in FIG. 7 of the drawings. In this case, there is a safety chain 70 rigidly connected to the fixed end of the arm 32. This chain has a length sufficient so that is can be connected to some portion of the forklift truck. In this way, when the cover is being paid-out from the tube disposed on the arm 32, the moment arm caused, in part, by the substantial weight of the cover, will not cause the forklift to be tipped over to one side that is the side, on which the arm 32 is extending outwardly from the carrier box.

Although the use of the chain to hold the box in a position on the forklift truck may be relatively simple, it is nevertheless highly effective. However, any other means for holding the carrier box on the forklift truck could be used. Moreover, it is also an effective mechanism to hold the box on the end of the forklift truck during transport.

Thus, there has been illustrated and described a unique and novel apparatus and method which fulfills all of the objects and advantages which have been sought. It should be understood that many changes, modifications, variations and other uses and applications which will become apparent to those skilled in the art after considering this specification and the accompanying drawings are covered by the invention. Therefore, any and all such changes, modifications, variations and other uses and applications which do not depart from the spirit and scope of the invention are deemed to be covered by the invention.

Having thus described the invention, what I desire to claim and secure by Letters Patent is:

1. Apparatus for covering a transportable load on a movable cargo carrier with minimal personnel intervention, said apparatus comprising;
   a) a movable weighted carrier having a portion sized for engagement and movement by a powered mover;
   b) means associated with said weighted carrier to removably engage the carrier and enable movement by a powered mover;
   c) an arm mounted on and extending outwardly from said carrier for a distance sufficient to receive a tube containing a load cover rolled thereon; and
   d) a tube receiving section on said arm adapted for receiving the tube with the cover rolled thereon such that a powered mover can move the arm and the tube carried thereby during movement relative to the load allowing the cover to be unrolled and draped over the top and sides of the load.

2. The apparatus for covering a transportable load of claim 1 further characterized in that said carrier comprises:
   a) a box-shaped structure; and
   b) a weight providing member located in said box-shaped structure.

3. The apparatus for covering a transportable load of claim 2 further characterized in that said tube receiving section comprises:
   a) an outwardly extending generally cylindrically shaped member sized to receive said tube.

4. The apparatus for covering a transportable load of claim 3 further characterized in that said:
   a) arm is mounted in a cantilever type arrangement such that the tube can be slid onto and off of said arm from an outer end thereof.

5. The apparatus for covering a transportable load of claim 2 further characterized in that the means to enable movement of the carrier comprises;
   a) a plurality of openings in said box-shaped structure sized to receive forks of a fork lift truck.

6. The apparatus for covering a transportable load of claim 1 further characterized in that said tube receiving section further comprises:
   a) locking means at an outer end of said tube receiving section for releasably locking a tube having a cover wound thereon and located in circumferential layers thereon.

7. The apparatus for covering a transportable load of claim 6 further characterized in that:
   a) said locking means is shiftable to the locked position when a tube with the cover wound thereon is disposed on said arm,
   b) and said locking means is manually shiftable to be opened to an open and unlocked position.

8. The apparatus for covering a transportable load of claim 7 further characterized in that said locking means further comprises;
   a) a link pivotally mounted in a first slot on one side of said tube receiving section; and
   b) a second slot on the opposite side of the tube receiving section aligned with first slot but of a shorter length.

9. Apparatus for feeding and locating a tarpaulin cover over a load on a flat bed truck, said apparatus comprising:
   a) a carrier block having a surface capable of being disposed on the bed of a flat bed truck;
   b) an arm mounted on, and extending outwardly from, the carrier block;
   c) engagement openings formed in said carrier block for receiving the forks of powered lifting and moving equipment; and
   d) a tube having a tarpaulin cover rolled thereon mounted on the arm and capable of being unspooled therefrom.

10. The apparatus for feeding and locating a tarpaulin cover of claim 9 further characterized in that;

a) said tube is removably mounted on said arm and allows the cover to be unspooled from and paid out to the load when the arm and tube are moved longitudinally with respect to the flat bed truck.

11. The apparatus for feeding and locating a tarpaulin cover of claim 10 further characterized in that;
   a) said arm is mounted at one end so that the arm is a cantilever mounted arm; and
   b) said arm is suitable for sliding said tube onto and off of said arm at an outer end thereof.

12. The apparatus for feeding and locating a transportable load of claim 9 further characterized in that said carrier comprises:
   a) a box-shaped structure sized to be initially located on the bed of the cargo carrier; and
   b) a weight providing member located in said box-shaped structure.

13. The apparatus for feeding and locating a transportable load of claim 9 further characterized in that said carrier comprises:
   c) an outwardly extending generally cylindrically shaped member sized to receive said tube.

14. A method for covering a load on a movable cargo carrier with minimum personal intervention, said method comprising;
   a) winding a tarpaulin cover about a tube having an axially extending hollow core;
   b) inserting the tube on an outwardly extending arm of a carrier block which is sized to removably receive the tube;
   c) engaging the carrier block with powered lifting equipment and moving same generally longitudinally relative to a load on the cargo carrier; and
   d) allowing the cover to pay out from the tube as the powered lifting equipment is moved relative to the load.

15. The method of covering a load of claim 14 further characterized in that said method comprises;
   a) sliding the tube over a free end of said arm from an outer end thereof; and
   b) removing the tube from the arm by sliding the tube over and off of the outer end of the arm.

16. The method of covering a load of claim 14 further characterized in that said method comprises;
   a) locking said tube onto said arm by shifting a locking link before movement of the powered lifting equipment.

17. The method of covering a load of claim 16 further characterized in that said method comprises;
   a) releasably locking the carrier block to the powered lifting equipment.

* * * * *